US005576742A

United States Patent [19]

Abe

[11] Patent Number: 5,576,742

[45] Date of Patent: Nov. 19, 1996

[54] IMAGE RECORDING HEAD HAVING CORROSION RESISTANT CONTROL ELECTRODES

[75] Inventor: Keizo Abe, Kanagawa, Japan

[73] Assignee: Fuji Xerox Co., Ltd., Tokyo, Japan

[21] Appl. No.: 159,222

[22] Filed: Nov. 30, 1993

[30] Foreign Application Priority Data

Dec. 1, 1992 [JP] Japan .................................... 4-343628

[51] Int. Cl.$^6$ ................................ G01D 9/00; B41J 2/06; B41J 2/39; B41J 2/40

[52] U.S. Cl. ......................... 346/150.1; 347/208; 347/55; 347/123; 347/141; 347/151

[58] Field of Search ................................ 346/150.1, 155, 346/154; 355/298; 347/147, 151, 141, 208, 55, 123; 397/208, 55, 123

[56] References Cited

U.S. PATENT DOCUMENTS 4,792,860 12/1988 Kuehrle .................................. 358/300
4,905,024 2/1990 Nishikawa et al. ....................... 347/55
4,990,939 2/1991 Sekiya et al. ........................... 347/147
5,198,839 3/1993 Takahashi et al. ........................ 347/64

*Primary Examiner*—Benjamin R. Fuller
*Assistant Examiner*—Raquel Yvette Gordon
*Attorney, Agent, or Firm*—Finnegan, Henderson, Farabow, Garrett & Dunner, L.L.P.

[57] ABSTRACT

An image recording head, for one of a image recording apparatus in which a voltage is applied to fine pattern electrodes to directly record an image on a recording medium and a image recording apparatus in which a voltage is applied to fine pattern electrodes to form an electrostatic latent image on an intermediate recording medium, the electrostatic latent image is developed to form a developed image, and the developed image is transferred and fixed to a recording medium, wherein at least a part of the fine pattern electrodes comprises a member selected from the group consisting of the elements of one of transition metals which is acid-resistant and electrolytically noncorrosive, and an alloy of titanium including at least one of group VIII metals of the periodic table. Accordingly, the image recording head which has a long life particularly under an environment of high temperature and humidity is provided.

8 Claims, 4 Drawing Sheets

IMAGE RECORDING HEAD HAVING CORROSION RESISTANT CONTROL ELECTRODES

DETAILED DESCRIPTION OF THE INVENTION

1. Field of Industrial Utility.

The present invention relates to an image recording head for recording directly or indirectly an image on a recording medium, and particularly to an image recording head which has a long life under an environment of high temperature and humidity.

2. Description of the Related Art

A conventional image recording head of the related art will be described taking a printing head for an ion ejection printer as an example. FIG. 1 schematically shows the entire configuration of the printing head for the ion ejection printer. A housing 101 of the printing head 100 is provided with a corona chamber 102 which is electrically conductive, a corona wire 103 which is stretched in the conductive corona chamber 102 in the direction perpendicular to the sheet, a high-voltage power source 104 for applying a high voltage of several thousands volts to the corona wire 103, and a reference potential source 105 which is connected to the outer wall of the conductive corona chamber 102. When the high voltage from the high-voltage power source 104 is applied to the corona wire 103, a corona discharge is generated so as to produce ions having a predetermined (preferably, positive) polarity. The produced ions are attracted to the wall of the conductive corona chamber 102 and the inner space of the conductive corona chamber 102 is filled with charged ions.

A pressurized transporting fluid (preferably, air) is fed into the conductive corona chamber 102 through an inlet channel 107 which elongates from an introduction pipe 106 in the direction of an arrow. The transporting fluid transports a number of ions filled in the conductive corona chamber 102 as ion currents. The ion currents flow from the conductive corona chamber 102 through an outlet channel 108 which is formed in the direction of an arrow, and pass through an ion modulation region 109 to be emitted to the outside of the conductive corona chamber 102.

In case of being emitted by the transporting fluid to the outside of the conductive corona chamber 102 through the outlet channel 108, the ion currents are controlled in the ion modulation region 109 in accordance with print information. This control is realized by selectively applying an output of a low-voltage source 112 of about 10 to 30 volts (DC) or a reference potential source 113 through thin film transistors (TFTs) 111 to a number of ion control electrodes 110 which are arrayed on the ion modulation region 109, in accordance with print information.

The ion control electrodes 110, and an opposing electrode wall **119*a* which is grounded function as electrodes which oppose each other through the gap of the ion modulation region 109, and constitute capacitors. When one of the ion control electrodes 110 is connected through the corresponding TFT 111 to the low-voltage source 112, a low voltage is applied between the ion control electrode 110 and the opposing electrode wall 119*a* so that an electric field is selectively generated in a direction perpendicular to the flow direction of the transporting fluid, whereby ion currents are repelled. The ion currents collide with the grounded opposing electrode wall 119*a* so that the state of the air molecules is changed from the ionic state to the neutral state, and the resulting air molecules are released into the atmosphere. In contrast, when one of the ion control electrodes 110 is connected through the corresponding TFT 111 to the reference potential source 113, the ion beam between the ion control electrode 110 and the opposing electrode wall 119*a*** is not affected by the electric field so as to be allowed to pass the space between them.

The ion currents emitted through the outlet channel 108 to the outside of the housing 101 is affected by an electric field generated by an accelerating back electrode 121 which is connected to a high-voltage power source 120 having a voltage of several hundreds to one thousand several hundred volts (DC) the polarity of which is opposite to the reference voltage source 113. Therefore, the ion currents are attracted toward the accelerating back electrode 121. A charge receptor 122 moving over the accelerating back electrode 121 receives the ion currents to be charged, whereby a latent charge pattern is formed on its surface. Then the latent charge pattern is made visible by an adequate developer (not shown).

When the ion currents are controlled as described above, as shown in FIG. 2, the electric field generated by the control voltage is applied not only to the opposing electrode wall **119*a* but also to the ion control electrodes 110 adjacent to the ion control electrode. When the resistance between adjacent ion control electrodes 110 is low, therefore, anodic oxidation is generated in the electrode of the higher potential. Furthermore, the resistance between adjacent ion control electrodes 110** is largely affected by the environment, and has a small value under high temperature and humidity.

The ion control electrodes 110 of the conventional printing head 100 comprises aluminum which is a particularly preferable electrode material so as to attain an excellent connection with the source, drain and gate electrodes of the TFT 111 comprising a-Si:H. However, the following phenomenon is known in the art. Aluminum constituting the bare ion control electrodes 110 are exposed to the corona gas (ozone) which is emitted from the conductive corona chamber 102 and exhibits a strong oxidative action. Concurrently with the oxidation of the ion control electrodes 110, therefore, the anodic oxidation lowers the control function of the printing array, thereby shortening the service life of the printing array. This phenomenon is caused by the fact that an insulating layer comprising aluminum accumulating on the ion control electrodes 110 functions as an electric resistance so as to lower a voltage actually applied to the ion control electrodes 110.

In order to solve the above problem, Unexamined Japanese Patent Publication No. SHO. 63-297059 discloses an improved printing array in which ion control electrodes include an alloy of aluminum and copper (Al-Cu). The publication states that, when an Al-Cu alloy containing 5% of copper is used as the material of ion control electrodes, the ion control electrodes is observed to have a life of about 500 hours before a catastrophic failure occurred. It is considered that this improved life is caused by copper which enters spaces between aluminum crystal grains and which functions as "mortar" so as to stop the migration of oxygen.

Furthermore, in order to solve the above problem, an inert material such as a noble metal, for example, gold, or platinum may be used as the material of ion control electrodes. In this case, the ion control electrodes are not affected by oxidation and etching. It has been confirmed experimentally that such ion control electrodes are highly resistant to corrosion. Since these materials are expensive, however, it is difficult to practically use them as the material of ion control electrodes.

Unexamined Japanese Patent Publication No. HEI. 2-2035 discloses to use conductive silicon as the material of ion control electrodes. Specifically, the publication discloses as follows. A conductive thin film (chrome) is evaporated on a substrate by a sputtering method, the conductive thin film is patterned into the form of ion control electrodes, a thin film layer of $n^+$ silicon is deposited on the patterned conductive thin film, and a patterning is again conducted. As a result, the surface of the $n^+$ silicon is oxidized so that silicon dioxide is formed on the surface of the thin film layer at the specific thickness (about 10 to 20 angstroms) which does not substantially affect the electrical conductivity of the electrodes. Since the thin film protects the ion control electrodes from the oxidation due to emitted corona gas and impurity dope in the $n^+$ silicon maintains the electrical conductivity of the electrodes at an adequate level, a life time of about 1,000 hours can be attained.

Also, ion control electrodes in which a silicide (CrSi) is used as the conductive silicon have been proposed. A silicide can be used in such ion control electrode, because a silicide is chemically inactive and therefore is not affected by oxidation and etching and the use of a silicide is allowable in a process of producing a printing head.

However, the above described related art has problems as follows. In case of testing the above improved printing array under high temperature and humidity (28° C., and 85%), an Al-Cu alloy used as the material of ion control electrodes has a life only about 100 hours, because of oxidation due to ions and anodic oxidation. In a printing array made of CrSi which is conductive silicon, oxidation of the surfaces of ion control electrodes is not observed, but electrolytic corrosion due to absorption of water occurs and a life is about 100 hours. In both cases, accordingly, there arises a problem in that a sufficiently long life cannot be attained under an environment of high temperature and humidity.

SUMMARY OF THE INVENTION

The invention has objects to solve the above problems and to supply an image recording head which has a long life particularly under an environment of high temperature and humidity.

The image recording head of the invention is an image recording head for an image recording apparatus in which a voltage is applied to fine pattern electrodes to form an image. The image recording head is so configured that a part of or all of the fine pattern electrodes are made of a transition metal which is acid-resistant and electrolytically noncorrosive, or an alloy of Ti (titanium) including at least one of a group VIII metal. Preferably, the alloy of titanium includes 1% or less of a group VIII metal of the periodic table. Further preferably, one of the transition metals which is acid-resistant and electrolytically noncorrosive is selected from the group consisting of tungsten, platinum, gold, titanium and tantalum and the group VIII metal is selected from the group consisting of platinum, palladium and iridium.

The image recording apparatus may be, for example, an ion ejection printer, and the image recording head may comprise a plurality of control electrodes for selectively causing an electric field to act on ions carried by a transporting fluid ejected from a conductive corona chamber.

The image recording apparatus may be, for example, an ion ejection printer, image recording is conducted by selectively applying a voltage to a plurality of pairs of discharge electrodes which oppose each other through an insulator, and using ions produced by a corona discharge.

The image recording apparatus may be, for example, an ink-jet printer, and image recording may be conducted by selectively causing ink from a slit or a plurality of nozzles formed on an ink chamber to fly or move in tow to the recording medium by means of an electric field.

The image recording apparatus may be, for example, an electric transfer printer, and image recording may be conducted by selectively applying a voltage to an electric heating medium having an ink layer, to cause the heating medium to partially generate heat, thereby melting ink, and by transferring the ink onto the recording medium.

The image recording apparatus may be, for example, a multistylus printer, and image recording may be conducted by selectively generating a corona discharge with using a multistylus in a space between the multistylus and the recording medium.

According to the present invention, a part of or all of the fine pattern electrodes comprise a transition metal which is acid-resistant and electrolytically noncorrosive, or an alloy of Ti (titanium) including at least one of a group VIII metal. Therefore, anodic oxidation due to an electric field which is generated by adjacent electrodes can be largely suppressed, and the life of an image recording head having fine pattern electrodes can be lengthened.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

THE PREFERRED EMBODIMENT OF THE INVENTION

Hereinafter, embodiments of the invention will be described with reference to the drawings.

First Embodiment

Figure 4:
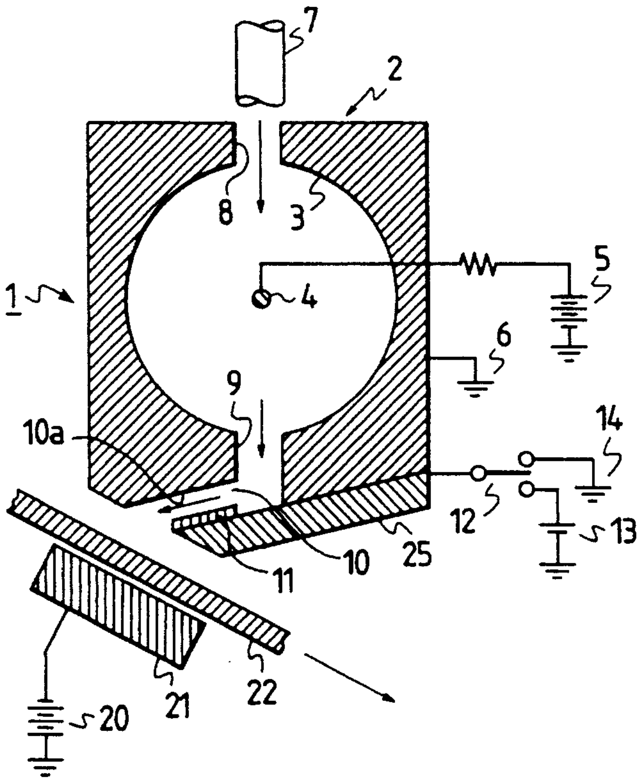
FIG. 4 is a section view showing an embodiment of an ion current control type electrostatic recording head to which the image recording head of the invention is applied.

FIG. 4 shows a printing head for an ion ejection printer which is an embodiment of the image recording head of the invention.

In the figure, 1 designates the printing head for the ion ejection printer. A housing 2 of the printing head 1 is provided with a corona chamber 3 which is electrically conductive, a corona wire 4 which is stretched in the conductive corona chamber 3 in the direction perpendicular to a sheet, a high-voltage power source 5 for applying a high voltage of several thousands volts to the corona wire 4, and a reference potential source 6 which is connected to the outer wall of the conductive corona chamber 3. When the high voltage from the high-voltage power source 5 is applied to the corona wire 4, a corona discharge is generated so that ions of a predetermined (preferably, positive) polarity are generated. The produced ions are attracted to the wall of the conductive corona chamber 3 so as to filling the inner space of the conductive corona chamber 3 with the charged ions.

A pressurized transporting fluid (preferably, air) is fed into the conductive corona chamber 3 through an inlet channel 8 which elongates from an introduction pipe 7 in the direction of an arrow. The transporting fluid transports a number of ions filled in the conductive corona chamber 3 as ion currents. The ion currents flow from the conductive corona chamber 3 through an outlet channel 9, and pass through an ion modulation region 10 to be emitted to the outside of the conductive corona chamber 3.

When emitted by the transporting fluid to the outside of the conductive corona chamber 3 through the outlet channel 9, the ion currents are controlled in the ion modulation region 10 in accordance with print information. This control is realized by selectively applying an output of a low-voltage source 13 of about 10 to 30 volts (DC) and a reference potential source 14 through thin film transistors (TFTs) 12 to a number of ion control electrodes 11 which are arrayed on the ion modulation region 10, in accordance with print information.

The ion control electrodes 11 and a grounded opposing electrode wall **10*a* function as electrodes which oppose each other through the gap of the ion modulation region 10 to constitute capacitors. When one of the ion control electrodes 11 is connected through the corresponding TFT 12 to the low-voltage source 13, a low voltage is applied between the ion control electrode 11 and the opposing electrode wall 10*a* so that an electric field is selectively generated in a direction perpendicular to the flow direction of the transporting fluid, whereby ion currents are repelled. Each of the ion currents collide with the grounded opposing electrode wall 10*a* so that the state of the air molecules is changed from the ionic state to the neutral state, and the resulting air molecules are released into the atmosphere. In contrast, when one of the ion control electrodes 11 is connected through the corresponding TFT 12 to the reference potential source 14, the ion beam between the ion control electrode 11 and the opposing electrode wall 10*a*** is not affected by the electric field so as to be allowed to pass the space between them.

The ion currents emitted through the outlet channel 9 to the outside of the housing 2 are affected by an electric field generated by an accelerating back electrode 21. The accelerating back electrode 21 is connected to a high-voltage power source 20 of the polarity opposite to that of the reference potential source 14 and several hundreds to one thousand several hundreds volts (DC). Therefore, the ion currents are attracted toward the accelerating back electrode 21. A charge receptor 22 moving over the accelerating back electrode 21 receives the ion currents to be charged, whereby a latent charge pattern is formed on its surface. Then the latent charge pattern is made visible by an adequate developer (not shown).

Next, the printing array of the printing head of the embodiment will be described with reference to FIG. 3.

Figure 1:
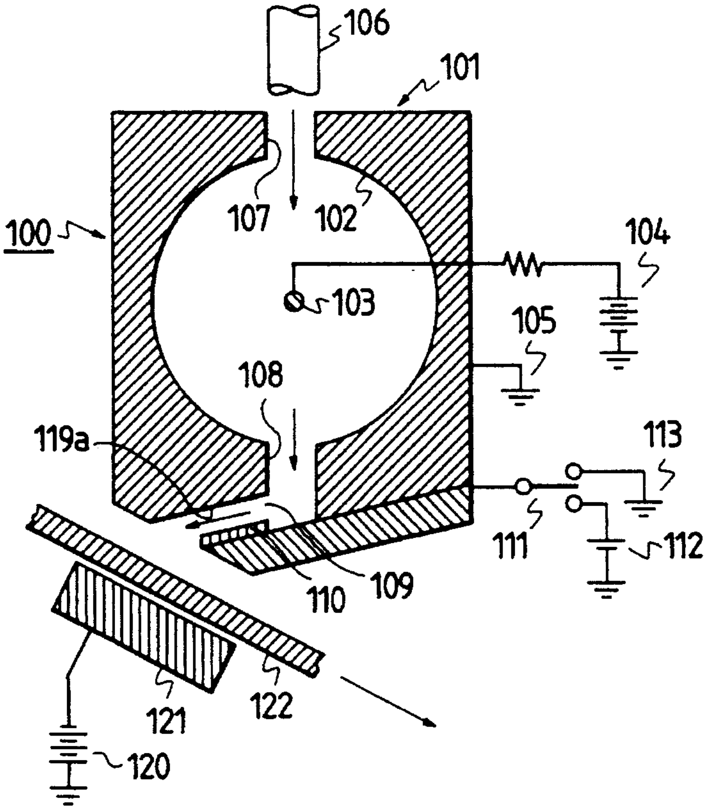
FIG. 1 PRIOR ART
FIG. 1 is a section view showing an ion current control type electrostatic recording head to which a prior art image recording head is applied.
Figure 2:
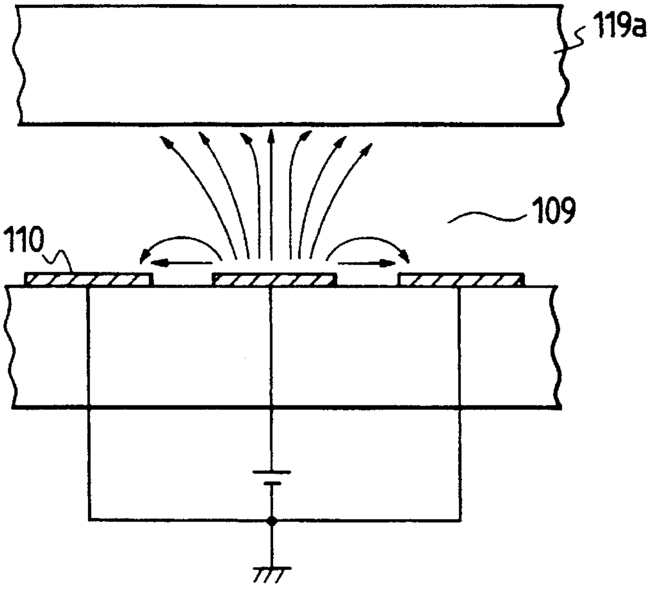
FIG. 2 PRIOR ART
FIG. 2 is a diagram illustrating the operation of the prior art example.
Figure 3:
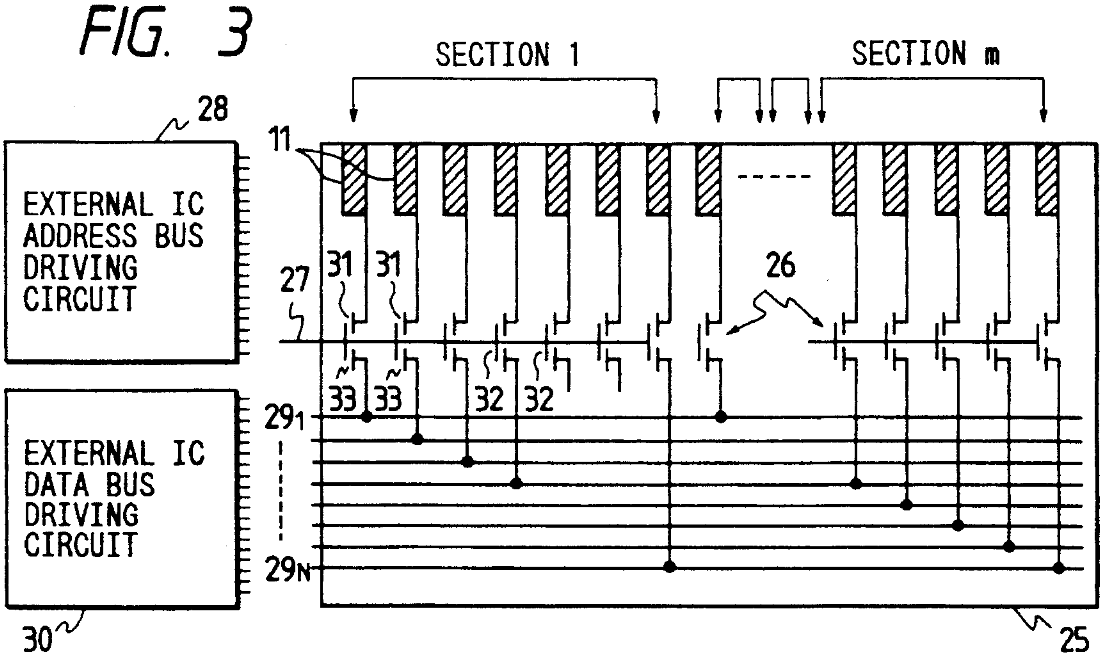
FIG. 3 is a plan view showing the configuration of a printing array which is used in an embodiment of the image printing head of the invention.

As shown in FIG. 3, the printing array comprises the ion control electrodes 11 which are arranged in the front end portion of an insulating substrate 25 in the direction perpendicular to the direction of the ion beams so as to be separated from each other at equal spaces, and thin film transistors (hereinafter, abbreviated as "TFT") 26 which are switching elements respectively connected to the separately arranged ion control electrodes 11. The printing array further comprises an external IC address bus driving circuit 28 which supplies ON/OFF control signals to the TFTs 26 through an address bus line 27, and an external IC data bus driving circuit 30 which selectively supplies a low potential and a reference potential to the ion control electrodes 11 through data bus lines 29.

The ion control electrodes 11 are connected to the source electrodes 31 of the TFTs 26, respectively. The address bus line 27 is connected to the gate electrodes 32 of the TFTs 26, and the data bus lines 29 are connected to the drain electrodes 33 of the TFTs 26, respectively.

The ion control electrodes 11 which are arranged on the insulating substrate 25 are divided into m sections each of which has an n number of ion control electrodes 11. The address bus line 27 which is connected to the external IC address bus driving circuit 28 functions as a signal line common to the TFTs 26 of all the sections. The drain electrodes 33 of the n number of TFTs 26 of each section are connected to the n number of data bus lines 29, respectively.

In the embodiment, the ion control electrodes comprises a transition metal which is acid-resistant and electrolytically noncorrosive, or an alloy of Ti (titanium) including at least one of group VIII metals. Preferably, the alloy of titanium includes 1% or less of a group VIII metal of the periodic table. Further preferably, one of the transition metals which is acid-resistant and electrolytically noncorrosive is selected from the group consisting of tungsten, platinum, gold, titanium and tantalum, and the group VIII metal is selected from the group consisting of platinum, palladium and iridium.

Namely, the ion control electrodes 11 are formed by evaporating Ti (titanium) in accordance with a predetermined pattern or etching Ti after forming a thin film on the insulating substrate 25.

Alternatively, the ion control electrodes 11 may comprise a transition metal other than Ti (titanium) which is acid-resistant and electrolytically noncorrosive, such as Ta (tantalum), or an alloy of Ti (titanium) including at least one of group VIII metals such as Pt, Pd, and Ir.

In the thus configured printing array for the ion ejection printer according to the embodiment, ion currents are controlled by the ion control electrodes in the following manner: The external IC data bus driving circuit 30 connected to the printing array supplies data (voltages) which are either of the low potential and the reference potential, to the ion control electrodes 11 of the objective section through the data bus lines 29. The external IC address bus driving circuit 28 applies a pulse to the gate electrodes 32 of the TFTs 26 in the unit of one section so that the objective section is selected. The ion control electrodes 11 of the selected section are supplied with either of the low potential and the reference potential.

Figure 5:
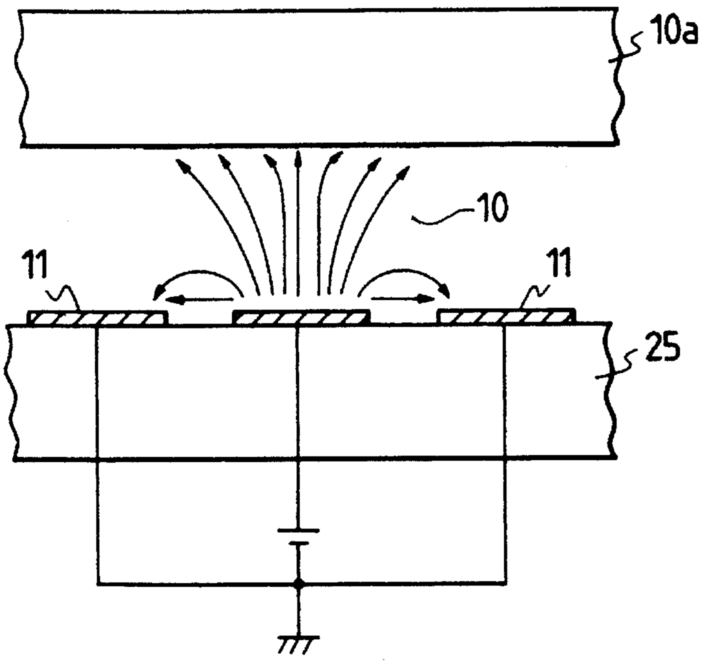
FIG. 5 is a diagram illustrating the operation of the embodiment.

At this time, an electric field is generated as shown in FIG. 5 between the ion control electrodes 11 to which the low potential is applied and the opposing outlet channel 9. The ion currents passing over these ion control electrodes 11 are accelerated by Coulomb force, toward the opposing electrode wall **10*a* which is grounded. When the ion currents collide with the opposing electrode wall 10a, the ion currents are changed to air molecules which are electrically neutral, and then released into the atmosphere. Therefore, these ion currents do not conduct the "writing" of a latent charge pattern on the charge receptor 22 moving over the accelerating back electrode 21**.

On the other hand, the ion beams passing through the spaces between the ion control electrodes 11 to which the reference potential is applied and the opposing outlet channel 9 are not affected by the electric field, and attracted by the accelerating back electrode 21, thereby conducting the "writing" of a latent charge pattern on the charge receptor 22.

In this way, an electrostatic latent image corresponding to image information is formed on the charge receptor 22.

When the control of ion currents is conducted as described above, as shown in FIG. 5, the electric field generated by the control voltage is applied not only to the opposing electrode wall 10a but also to the ion control electrodes 11 adjacent to the ion control electrode. When the resistance between adjacent ion control electrodes 11 is low, therefore, an anodic oxidation is generated in the electrode of the higher potential. Furthermore, the resistance between adjacent ion control electrodes 11 is largely affected by the environment, and has a small value under high temperature and humidity. Moreover, the bare ion control electrodes 11 are exposed to the corona gas (ozone) which is emitted from the conductive corona chamber 3 and exhibits a strong oxidative action.

In the embodiment, however, the ion control electrodes 11 comprises Ti (titanium) metal which forms on the surface a passivation coating against anodical dissolution and exhibits excellent corrosion resistance against a corona gas (ozone) and the like by means of the protective action of the passivation coating. Therefore, the ion control electrodes 11 comprising Ti (titanium) metal have a sufficiently long life against oxidation due to ions and anodic oxidation even under an environment of high temperature and humidity (28° C., and 85%).

The inventor has experimented in confirming the effects of the invention.

Under an environment of high temperature and humidity (28° C., and 85%), the printing array of the embodiment comprising Ti was put to the printing test. As a result, a life of more than 1,000 hours was obtained. In contrast, under the same environment, the conventional printing array comprising aluminum copper alloy (Al-Cu) was put to the printing test. As the result of the experiment, only a life of 100 hours was obtained.

Further, in putting a conventional printing array comprising conductive silicon (CrSi) under the same environment to the printing test, oxidation of the surfaces of ion control electrodes was not observed. However, since water was absorbed to the surface, electrolytic corrosion was caused to occur by the potential difference between adjacent electrodes, and a life was about 200 hours.

In the above experiments, the material of the ion control electrodes 11 of the printing array comprised Ti or Ta. Printing arrays having ion control electrodes which were made of either of a Ti-Pt alloy, a Ti-Pd alloy, and a Ti-Ir alloy in place of Ti or Ta were subjected to a test for a longer period, resulting in that there was produced no problem.

Second Embodiment

Figure 6:
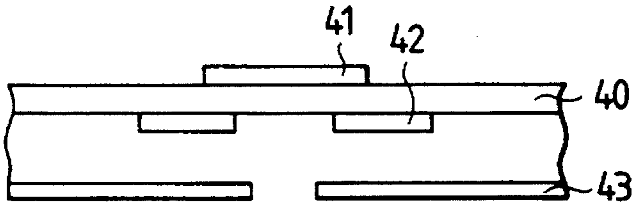
FIG. 6 is a view showing the configuration of a second embodiment of the image recording head of the invention.

FIG. 6 shows another embodiment of the head for an ion ejection printer. In the second embodiment, a first electrode 41 is opposed to second electrodes 42 so as to sandwich an insulating substrate 40. The first electrode 41 is a single electrode which elongates in the direction perpendicular to the sheet. The second electrodes 42 are formed dividedly in the direction perpendicular to the sheet so as to obtain desired resolution. An output of a high-voltage and high-frequency power source which is not shown is selectively applied between the first electrode 41 and the second electrodes 42 so as to generate a corona discharge to produce ions, whereby an electrostatic latent image is formed on an image carrier (not shown). In the figure, reference numeral 43 designates a screen electrode.

The second electrodes 42 are formed in a highly dense manner as described above. This configuration causes a high potential difference to be generated between adjacent electrodes in the same manner as the first embodiment. Accordingly, a part of or all of the second electrodes 42 comprises a transition metal which is acid-resistant and electrolytically noncorrosive, or an alloy of Ti (titanium) including at least one of group VIII metals so as to be possible to increase the life of the head.

Preferably, the alloy of titanium includes 1% or less of a group VIII metal of the periodic table. Further preferably, one of the transition metals which is acid-resistant and electrolytically noncorrosive is selected from the group consisting of tungsten, platinum, gold, titanium and tantalum, and the group VIII metal is selected from the group consisting of platinum, palladium and iridium.

Third Embodiment

Figure 7:
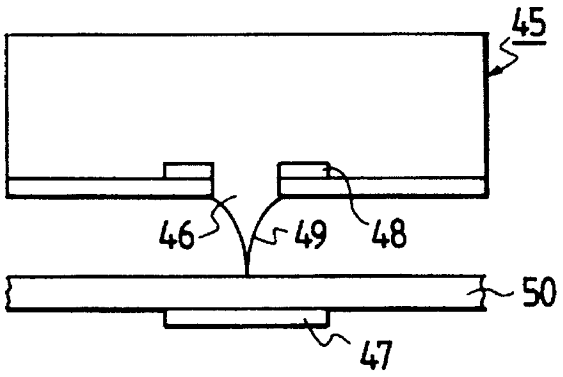
FIG. 7 is a view showing the configuration of a third embodiment of the image recording head of the invention.

FIG. 7 shows an embodiment of an image recording head for an ink-jet printer. In the image recording head 44, a slits 46 (or nozzles in desired resolution) which functions as an ink outlet is formed on one end face of an ink chamber 45 so as to elongate in the direction perpendicular to the sheet. A back electrode 47 is biased by a power source which is not shown. By changing the level of a voltage of individual electrodes 48, ink 49 is caused to fly onto a recording medium 50 introduced between the head 44 and the back electrode 47 to conduct the recording thereon. Also in this recording head 44, a high potential difference is generated between adjacent individual electrodes 48 in the same manner as the first embodiment. As a countermeasure to this problem, a part of or all of the individual electrodes 48 comprises a transition metal which is acid-resistant and electrolytically noncorrosive, or an alloy of Ti (titanium) including at least one of group VIII metals so as to be possible to increase the life of the head.

Preferably, the alloy of titanium includes 1% or less of a group VIII metal of the periodic table. Further preferably, one of the transition metals which is acid-resistant and electrolytically noncorrosive is selected from the group consisting of tungsten, platinum, gold, titanium and tantalum, and the group VIII metal is selected from the group consisting of platinum, palladium and iridium.

Fourth Embodiment

Figure 8:
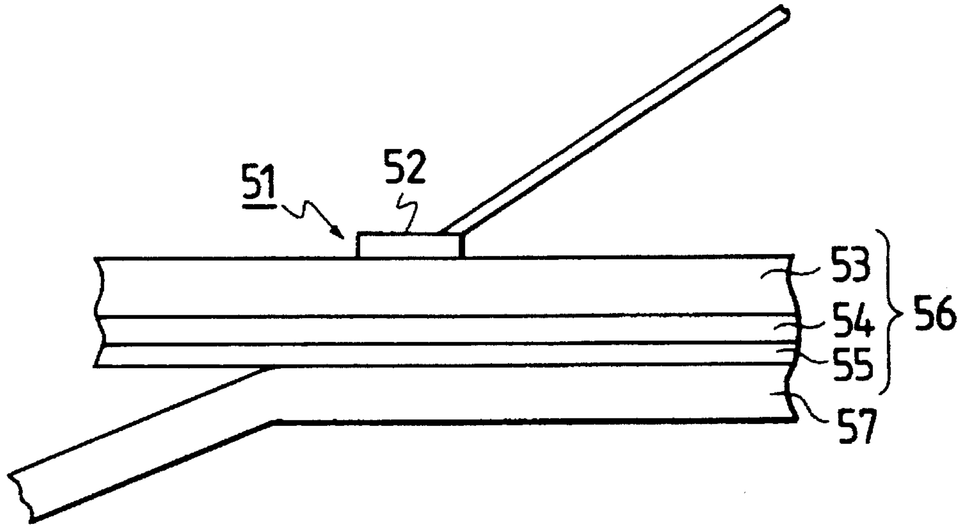
FIG. 8 is a view showing the configuration of a fourth embodiment of the image recording head of the invention.

FIG. 8 shows an embodiment of an image recording head for an electric transfer type recording apparatus. In the recording head 51, recording electrodes 52 are formed dividedly in the direction perpendicular to the sheet so as to obtain desired resolution. A voltage is selectively applied through the recording electrodes 52 to an electric heating medium 56 including a heating layer 53, a return path layer 54, and an ink layer 55, so that the heating layer 53 is partially heated to melt the ink layer 55. As a result, the ink layer 55 is transferred onto a recording medium 57 record images.

Also in the recording head 51, a high potential difference is generated between adjacent recording electrodes 52 in the same manner as the first embodiment. As a countermeasure to this, a part of or all of the recording electrodes 52 comprises a transition metal which is acid-resistant and electrolytically noncorrosive, or an alloy of Ti (titanium) including at least one of group VIII metals so as to be possible to increase the life of the head.

Preferably, the alloy of titanium includes 1% or less of a group VIII metal of the periodic table. Further preferably, one of the transition metals which is acid-resistant and electrolytically noncorrosive is selected from the group consisting of tungsten, platinum, gold, titanium and tantalum, and the group VIII metal is selected from the group consisting of platinum, palladium and iridium.

Fifth Embodiment

Figure 9:
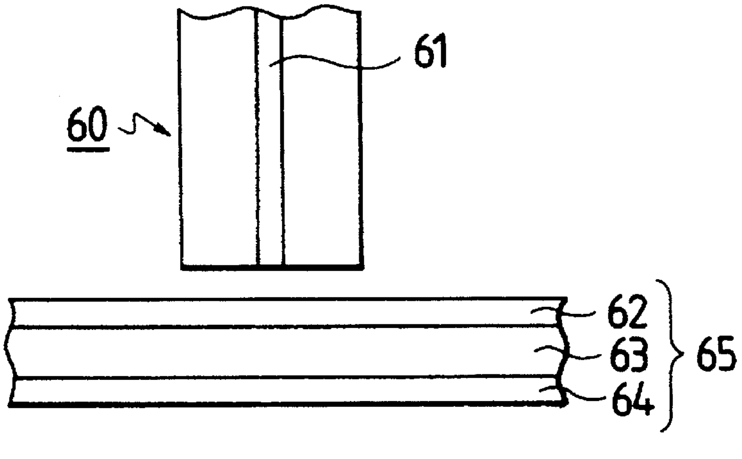
FIG. 9 is a view showing the configuration of a fifth embodiment of the image recording head of the invention.

FIG. 9 shows an embodiment of an image recording head for a multistylus printer. In the recording head 60, stylus electrodes 61 are formed dividedly in the direction perpendicular to the sheet so as to obtain desired resolution. A voltage is selectively applied through the stylus electrodes 61 to a recording medium 65 including an insulating layer 62, a resistance layer 63, and a return path layer 64, so that a corona discharge is generated between the selected stylus electrodes 61 and the recording medium 65. As a result, an electrostatic latent image is formed on the recording medium 65 to record images.

Also in the recording head 60, a high potential difference is generated between adjacent stylus electrodes 61 in the same manner as the first embodiment. As a countermeasure to this, a part of or all of the stylus electrodes 61 comprises a transition metal which is acid-resistant and electrolytically noncorrosive, or an alloy of Ti (titanium) including at least one of group VIII metals so as to be possible to increase the life of the head.

According to the invention which has a configuration and effects as described above, a part of or all of fine pattern electrodes comprises a transition metal which is acid-resistant and electrolytically noncorrosive, or an alloy of Ti (titanium) including at least one of group VIII metals, whereby an image recording head which has a long life particularly under an environment of high temperature and humidity can be provided.

Preferably, the alloy of titanium includes 1% or less of a group VIII metal of the periodic table. Further preferably, one of the transition metals which is acid-resistant and electrolytically noncorrosive is selected from the group consisting of tungsten, platinum, gold, titanium and tantalum, and the group VIII metal is selected from the group consisting of platinum, palladium and iridium.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image recording head for an image recording apparatus in which a voltage is applied to fine pattern electrodes to form an image, wherein at least a part of said fine pattern electrodes is exposed to atmosphere and comprises a member selected from the group consisting of tungsten, titanium, tantalum, and an alloy of titanium including at least one of a group VIII metal of the periodic table.

2. An image recording head according to claim 1, wherein said image recording apparatus is an ion ejection printer including a plurality of control electrodes for selectively applying an electric field to ions carried by a transporting fluid ejected from a conductive corona chamber.

3. An image recording head according to claim 1, wherein said image recording apparatus is an ion ejection printer including a plurality of discharge electrode pairs, each electrode pair comprised of a first electrode, a second electrode, and an insulator formed therebetween, in which images are recorded by selectively applying a voltage to a plurality of pairs of discharge electrodes which oppose each other through an insulator and using ions produced by a corona discharge.

4. An image recording head according to claim 1, wherein said-image recording apparatus is an ink-jet printer, in which images are recorded by selectively causing ink from a slit or a plurality of nozzles formed on an ink chamber to fly or move in tow to said recording medium by means of an electric field.

5. An image recording head according to claim 1, wherein said image recording apparatus is an electric transfer printer, in which images are recorded by selectively applying a voltage to an electric heating medium having an ink layer, heating a part of said heating medium so as to melting ink, and transferring the ink onto said recording medium.

6. An image recording head according to claim 1, wherein said image recording apparatus is a multistylus printer, in which images are recorded by selectively generating a corona discharge with using a multistylus in a space between said multistylus and said recording medium.

7. An image recording apparatus according to claim 1, wherein said alloy of titanium includes 1% or less of a group VIII metal of the periodic table.

8. An image recording apparatus according to claim 1, wherein said group VIII metal is selected from the group consisting of platinum, palladium and iridium.

* * * * *